United States Patent [19]

Brandenstein et al.

[11] Patent Number: 5,015,216
[45] Date of Patent: May 14, 1991

[54] PREMOUNTED TENSIONING DEVICE

[75] Inventors: Manfred Brandenstein, Eussenheim; Wolfgang Friedrick, Schweinfurt; Roland Haas, Hofheim; Gerhard Herrmann, Schweinfurt, all of Fed. Rep. of Germany

[73] Assignee: SKF GmbH, Schweinfurt, Fed. Rep. of Germany

[21] Appl. No.: 379,872

[22] Filed: Jul. 14, 1989

[30] Foreign Application Priority Data

Jul. 16, 1988 [DE] Fed. Rep. of Germany ....... 3824184

[51] Int. Cl.⁵ ............................................. F16H 7/08
[52] U.S. Cl. ................................... 474/101; 474/112; 474/135
[58] Field of Search .................. 474/101, 109–115, 474/117, 133, 135, 136, 138; 403/145, 146, 129

[56] References Cited

U.S. PATENT DOCUMENTS

| 2,691,307 | 10/1954 | Pillsbury | 474/112 |
| 4,634,407 | 1/1987 | Holtz | 474/112 |
| 4,826,471 | 5/1989 | Ushio | 474/135 |
| 4,832,665 | 5/1989 | Kadota et al. | 474/112 |

FOREIGN PATENT DOCUMENTS 7412059 5/1974 Fed. Rep. of Germany.

Primary Examiner—Thuy M. Bui
Attorney, Agent, or Firm—Rosen, Dainow & Jacobs

[57] ABSTRACT

In a pre-mounted tensioning device the fastening bolt is covered by the idler wheel. The fastening bolt is serviced through a recess provided in the wheel surface. A pre-mounted unit is created through the insertion of a fastening bolt whose head is pushed by spring elements against the wheel surface, thus preventing the idler wheel from turning and forcing the recess to coincide with the fastening bolt.

5 Claims, 1 Drawing Sheet

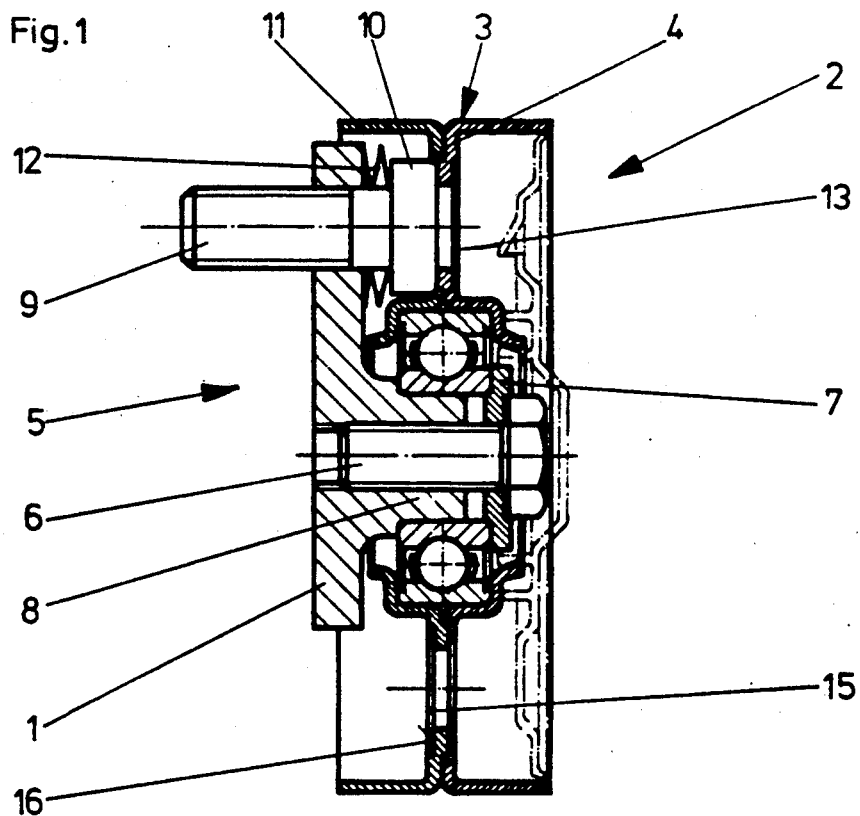
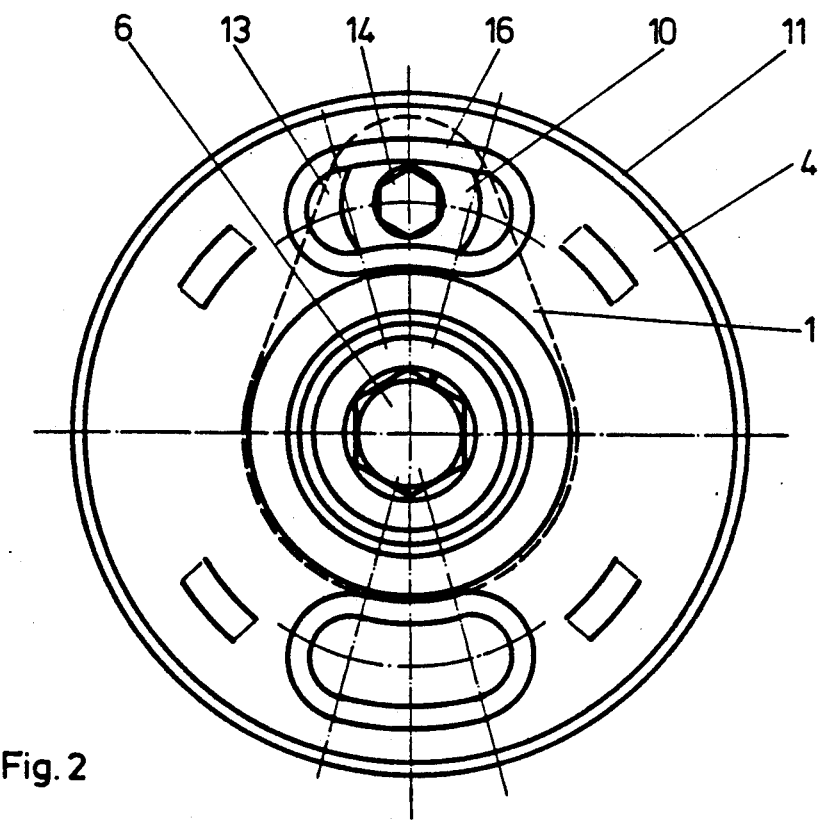

PREMOUNTED TENSIONING DEVICE

FIELD OF THE INVENTION

The invention concerns a tensioning device, and particularly a pre-mounted tensioning device having an idler wheel rotating on a bearing on a base.

BACKGROUND OF THE INVENTION

A tensioning device of this type is known from German Utility Model DE-GM 7 412 059. In the German Utility Model, the base plate to which the idler wheel is attached is rather large, allowing the bolts for attachment of the base plate to an engine block to be placed outside the wheel surface. When space allowance is limited, the base plate must be reduced. When special requirements exist, space will only be available underneath the idler wheel. As a result, the servicing of the bolts during installation will be awkward and complicated.

SUMMARY OF THE INVENTION

It is the object of the invention to provide a novel and unique construction of a tensioning device which will allow simple installation with little effort, even under cramped conditions.

The foregoing object is achieved by a construction wherein the bolt for attaching the idler wheel, located in the area between the idler surface and the bearing of the idler wheel and serviceable through a recess in the idler wheel, rests against the idler wheel by way of a spring element which acts on the base. In most cases the idler wheel has an annular section, holding the roller wheel surface against the bearing. This section — often disk-shaped with metal wheel surfaces — has a recess with the same axis as the bolt in question. Thus it is possible to service the bolt readily with the appropriate tool from the front of the tensioning device although it is covered by the idler wheel. To reduce the mounting effort, it is preferable to install a bolt during the manufacturing process itself. When the size of the bolt is right, the cover provided by the idler wheel will automatically yield a compact pre-mounted unit secured for transportation. The idler wheel can rotate freely at any time with regard to the base and, as a rule, one or two recesses are sufficient for servicing with the tool. It is therefore necessary, before the mounting, to make the servicing recess overlap with the bolt. To avoid this searching process the tensioning device according to the invention is preferably equipped with a spring element between the head of the bolt and the base to which it is to be attached. The spring element moves the bolt axially until it touches the idler wheel. In the pre-mounted condition the recess is made to overlap with the bolt. As a result, depending on the available spring force, the bolt and the idler wheel will be friction-tight, thus preventing any unexpected displacement. In addition, appropriate projections in the rim of the recess will make it possible to create an interlocking attachment. The embodiment according to the invention allows a very simple installation and, above all, the effective insertion of the tool. When tightening the bolt the spring element — designed for example as a lock washer — is compressed and functions simply as a washer. In this process, the head has distanced itself from the idler wheel and the friction fit or interlocking condition no longer exists. In its built-in condition, the idler wheel can turn freely again. The embodiment according to the invention lends itself to fixed idler wheels with one or more bolts, bolts, and also to swivable, adjustable tensioning devices.

Further characteristics according to the invention are described hereafter with the aid of the example shown in the drawing.

BRIEF DESCRIPTION OF THE DRAWINGS

FIG. 1 shows a longitudinal section of a tensioning device with an inserted bolt in pre-mounted condition, and FIG. 2 shows a top view of the tensioning device shown in FIG. 1.

DETAILED DESCRIPTION

The tensioning device shown in the figures consist of a base 1 carrying a bearing-mounted rotating idler wheel 2. The wheel surface 3 of the idler wheel 2 consist of two metal stampings crimped together to form an annular support section 4. The bearing is attached by means of a bolt 6 and a thrust washer 7 on a projection 8 of the base 1. Near the support section 4 a bolt 9 serves to attach the base 1 to a suitable mounting surface such as an engine block, not shown here. The head 10 of the bolt 9 is positioned between the wheel surface 11 and the bearing 5, held axially by way of a spring element lock washer 12 set against the base 1 and therefore pushed under spring tension against the support section 4. The latter is equipped with a recess 13 designed as a slot in circumferential direction whose radial width allows the insertion of a tool in the hexagon socket 14 of the bolt 9. The slot is surrounded by a depression 15 which fits the head 10, which depression provides an axial stop 16 for the head and an interlocking fit in a circumferential direction. Thus, on the one hand, the bolt 9 is held in a directionally stable position and cannot be lost and, on the other hand, a permanently free opening for the tool has been created. The slot 13 makes it possible for the idler wheel 2, during mounting, to adjust to the drive belt — not shown — with minimal turning and without overlapping with the hexagon socket 14 of the bolt 9. Diametrically across from the item described, there is an identical recess 13. With its moving part the idler wheel 2 covers fully the bolt 9 and the base.

During tightening — not shown in detail — the head 10 of the bolt 9 is turned away from the depression 15, the interlocking fit is released and the set lock washer 12 is compressed until the arrangement is flush. As a result, the idler wheel 2 can turn freely again.

Alternatively the belt 9 can be a plurality of bolts, with an appropriate plurality of recess of matching size and location provided in the idler wheel. The above described embodiment can be modified in a variety of ways and those modifications would remain within the spirit and scope of the present invention. Thus, while this invention has been disclosed by means of a specific illustrative embodiment, the principals thereof are capable of a wide range of modifications by those skilled in the art within the scope of the following claims.

What is claimed is:

1. A pre-mounted tensioning device comprising, for use with an idler wheel adapted to rotate on a bearing on a base, at least one fastening bolting means mounting said base to a mounting surface, said bolt located in an area between the surface of said idler wheel and said bearing, said surface of said wheel including a recess for allowing access to said bolting means, a spring element coupled between said base and said bolting means and acting on said base, said bolting means, before mounting, resting against said idler wheel surface by way of said spring element.

2. The tensioning device according to claim 1, wherein at least one of said recess and said bolting means are equipped with mutual interlocking fitting means.

3. The tensioning device according to claim 1, wherein said bolting means has a head with a hexagon socket, said recess including a depression which matches said head and an adjacent access opening limited to the size of a tool for said hexagonal socket.

4. The tensioning device according to claim 1, wherein said bolting means including a plurality of bolts, said wheel including a plurality of appropriate recesses with regard to size and location, aligned with said bolts.

5. The tensioning device according to claim 1, wherein said recess is shaped as a slot extending in the direction of the circumference, of said wheel, said slot including a corresponding depression for the head of said bolting means.

* * * * *